Figure 1:
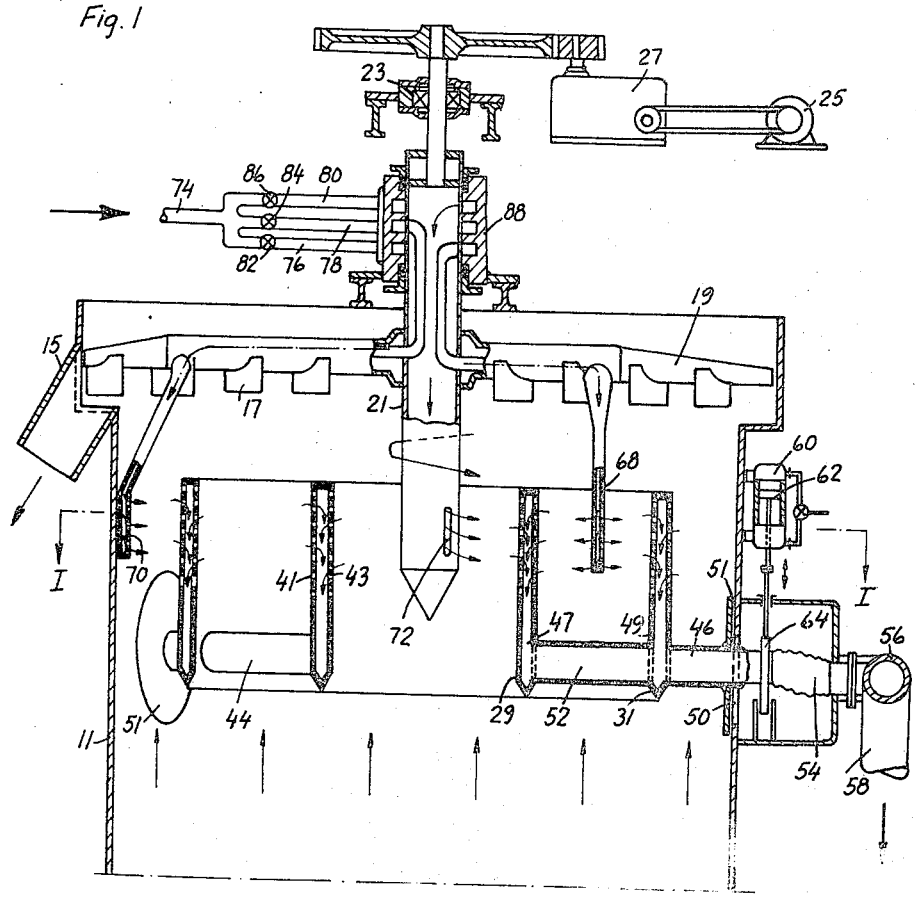

Oct. 24, 1967  J. C. F. C. RICHTER  3,348,390
CELLULOSIC MATERIAL PROCESS VESSEL LIQUID DISTRIBUTION DEVICE
Filed March 22, 1966  5 Sheets-Sheet 3

INVENTOR
JOHAN C.F.C. RICHTER
BY Cushman, Darby & Cushman
ATTORNEYS

Oct. 24, 1967     J. C. F. C. RICHTER     3,348,390
CELLULOSIC MATERIAL PROCESS VESSEL LIQUID DISTRIBUTION DEVICE
Filed March 22, 1966

INVENTOR
JOHAN C. F. C. RICHTER
BY Cushman, Darby & Cushman
ATTORNEYS

United States Patent Office 3,348,390
Patented Oct. 24, 1967

3,348,390
CELLULOSIC MATERIAL PROCESS VESSEL
LIQUID DISTRIBUTION DEVICE
Johan C. F. C. Richter, St.-Jean-Cap-Ferrat, Alpes-Maritimes, France, assignor to Aktiebolaget Kamyr, Karlstad, Sweden, a company of Sweden
Filed Mar. 22, 1966, Ser. No. 536,325
Claims priority, application Sweden, Mar. 25, 1965, 3,847/65
12 Claims. (Cl. 68—181)

The present invention relates to a device for the distribution of liquid in a cellulosic material container. More specifically, the present invention relates to a device located in an upright cylindrical process vessel adapted for axially directed flow of cellulosic material wherein the device distributes liquid, such as wash liquid, in a desired distribution over a cross-section of the container.

The prior art has used liquid distributing devices comprising one or more arms which rotate about the axis of a container and are provided with outlet orifices, communicating with liquid supply conduits, to distribute liquid over a cross-sectional area of, for example, a cellulosic material process vessel. See, for example, U.S. Patent No. 3,078,703. These prior art liquid distributors have not been completely satisfactory in operation, as the outlet orifices were easily clogged by fibers, the clogging being particularly pronounced in the orifices situated further from the axis of rotation, and it has been, therefore, difficult to maintain a desired distribution of the liquid over a cross-sectional area of the container. After some time of operation, the clogging of the outlet orifices will cause the distribution of the liquid to deviate from the desired distribution, generally with too much liquid being supplied to the central area of the container. With the prior art liquid distributors, it was quite difficult to know when to clean the orifices as such clogging was difficult or impossible to detect.

Therefore, it is an object of this invention to provide a novel liquid distributor for cellulosic material process vessels. It is another object of this invention to provide a liquid distributor for cellulosic material process vessels wherein liquid outlet orifices in the distribution device do not have a tendency to be clogged by cellulosic fibers. It is another object of this invention to provide a liquid distributor for cellulosic material process vessels or containers wherein a desired liquid distribution may be safely maintained for prolonged periods of operation. Still further objects and the entire scope of applicability of the present invention will become apparent from the detailed description given hereinafter; it should be understood, however, that the detailed description, while indicating preferred embodiments of the invention, are given by way of illustration only, since various changes or modifications within the scope of the invention will become apparent to those skilled in the art from this detailed description.

According to the present invention, the above objects are attained by providing liquid distributing devices with outlet orifices or groups of orifices which move at mutually different radial distances from the axis of the container and are connected to separate liquid supply conduits, at least some of the liquid supply conduits being provided with independently adjustable flow control means. The independently adjustable flow control means may be placed at easily accessible locations, permitting ready adjustment of a correct distribution of the liquid over the cross-section of the container. In addition, the distrbution is not appreciably disturbed by minor clogging of some of the outlet orifices.

Figure 2:
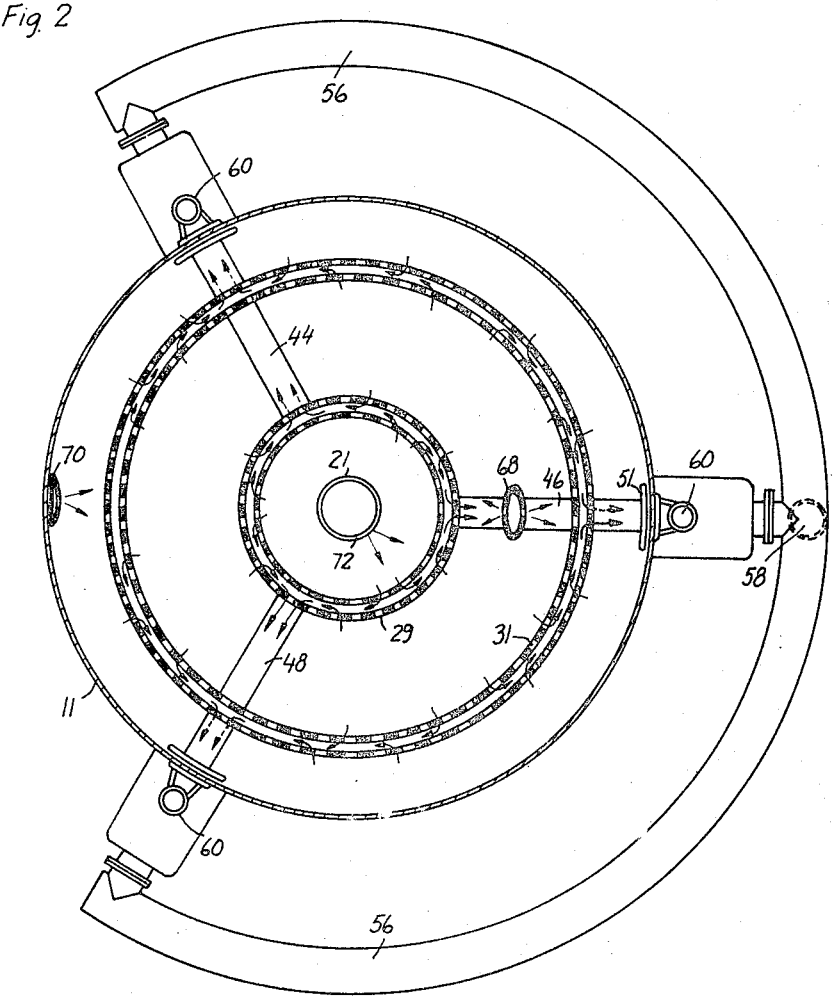
Figure 3:
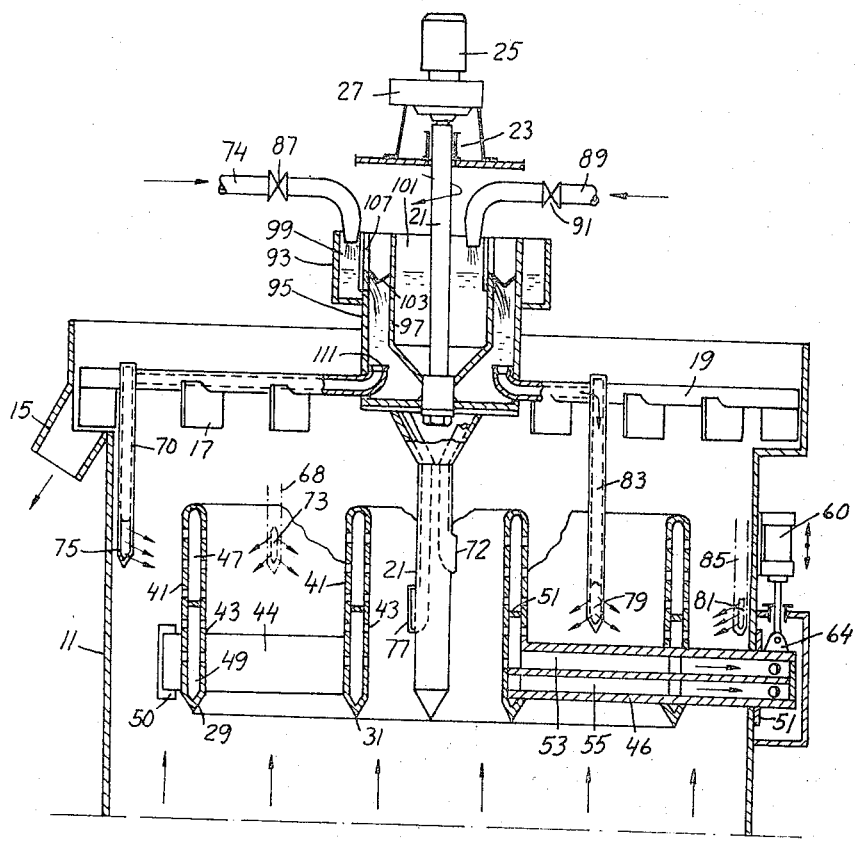
Figure 4:
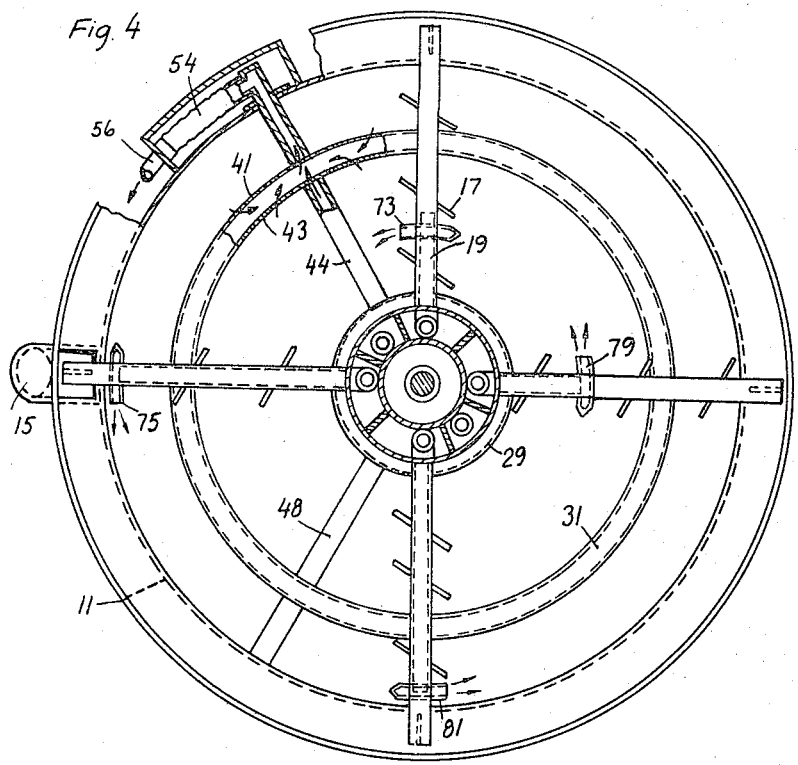
Figure 5:
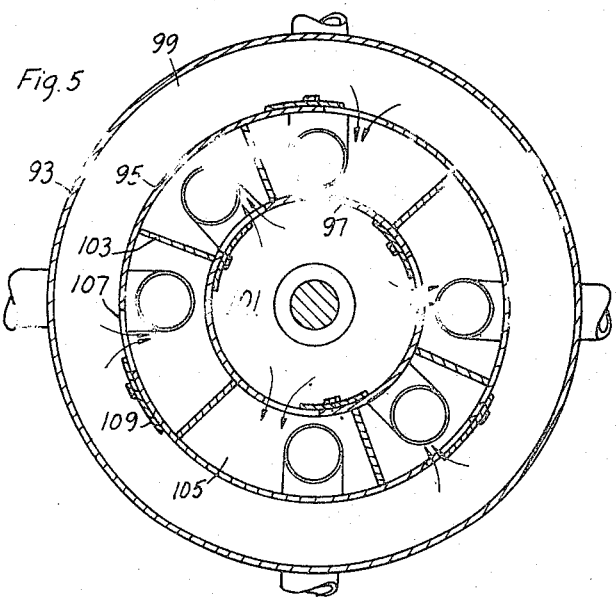
Figure 6:
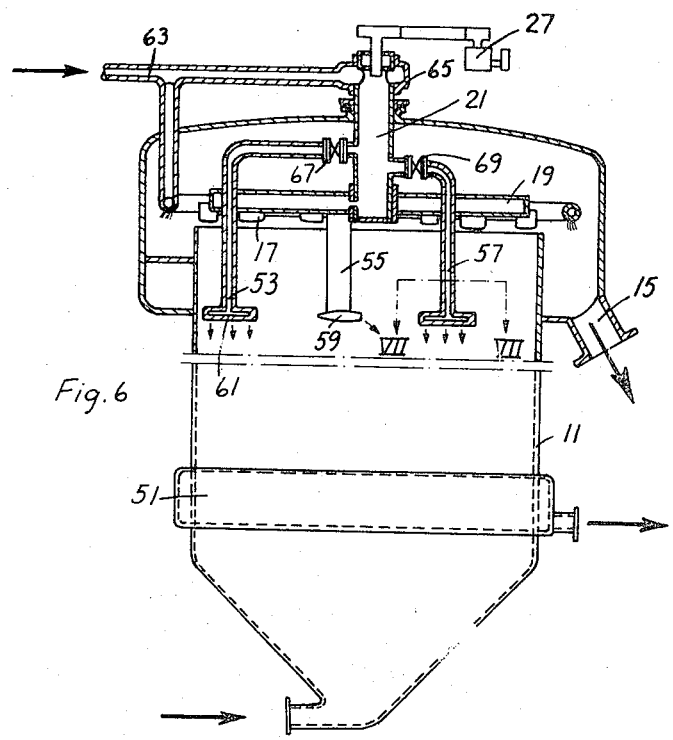
Figure 7:
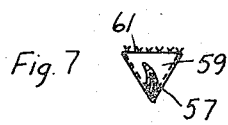

The invention will be more fully understood by reference to the accompanying drawings. FIGURE 1 is a vertical sectional view of a cellulosic material process vessel provided with the liquid distribution device of the present invention. FIGURE 2 is a horizontal sectional view of the vessel of FIGURE 1 taken along the line I—I. FIGURE 3 is a vertical sectional view of a cellulosic material process vessel provided with a different embodiment of the liquid distribution device of the present invention. FIGURE 4 is a plan view of the process vessel and the liquid distribution device of FIGURE 3, partly shown in horizontal cross-section. FIGURE 5 is an enlarged view of the central portion of FIGURE 4. FIGURE 6 is a vertical cross-sectional view of a cellulosic material process vessel with yet another embodiment of the present invention. FIGURE 7 is a horizontal cross-sectional view of the arm 57 of FIGURE 6 taken along the lines VII—VII.

Referring more specifically to FIGURES 1 and 2, an upright cylindrical process vessel 11 is adapted for the treatment of pulp, i.e., generally a suspension of cellulosic fiber material and water. For instance, the container may form a digester for chips, straw or other finely comminuted vegetabilic material, or a tower for bleaching of previously digested and defibrated cellulosic pulp of a more or less viscous consistency. If desired, the container may be used merely for washing of pulp. The process vessel is provided at its bottom with feeding means (not shown) for feeding the cellulosic fiber material axially therethrough in an upward direction, either fully continuously or semi-continuously by periodically supplying pulp in baches, which may be of large or small size. The feeding means causes the pulp supplied to the vessel to rise vertically upward through the vessel as a coherent column. At the top of the container there is a discharge device which moves the pulp towards a lateral discharge outlet 15. The discharge device consists of a scraping device comprising obliquely set plates 17 supported by radial supporting arms 19 attached to a rotary vertical shaft 21. The shaft 21 is centrally located in the vessel and its upwardly projecting end is journalled in a bearing 23 and is driven by a motor 25 through gear 27. If desired, the vessel 11 may be closed at the top and placed under a positive pressure.

A straining device is located in the process vessel 11 and consists of two annular strainer bodies 29, 31 located at substantially the same level and concentric with each other and with the major axis of the vessel. Each strainer body is composed of two mainly cylindrical strainer plates 41, 43 which are of a slightly different diameter and are joined at their upper and lower edges. The distance between the strainer plates, which is considerably less than their axial length, and their mutual connection are chosen with regard to the free flow of the liquid in the cavities defined by the plates 41, 43 and the mechanical rigidity of the strainer body itself. In a radial cross-sectional plane, the strainer has a configuration which is elongated in the vertical direction and has pointed or rounded ends in order to set up the least possible resistance to movement in the axial direction relatively to the pulp. The strainer plates 41, 43 are substantially vertical everywhere and are apertured or vertically slitted over at least the main part of their faces. Liquid strained off the pulp is collected in the cavities 47, 49 of the strainer bodies. The strainer bodies are situated at such radial distances from the axis of the container that their straining effect is essentially evenly distributed over the cross-sectional area of the container. The strainer bodies are rigidly secured to horizontally and radially extending supporting arms 44, 46, 48, the outermost ends of which project through apertures 50 in the shell of the vessell 11. The apertures 50 are sufficiently large in the vertical direction to allow a restricted motion of the supporting arms 44, 46, 48 in the axial direction of the container. Plates 51 attached to the supporting arms 44, 46, 48 cover the apertures 50 in order to reduce leakage therethrough. Each of the supporting arms 44, 46, 48 is tubular, defining an inner cavity 52 which communicates at one end with the cavities 47, 49 within the strainer bodies 29, 31 and at the other end via a hose 54 with an exterior manifold 56 and a discharge conduit 58. The strainer bodies may be vertically displaceable back and forth by a power source located outside the container and adapted to cooperate with the projecting ends of the supporting arms 44, 46, 48, for example, as shown by my copending application Ser. No. 360,962, filed Apr. 20, 1964. As shown for each supporting arm 44, 46, 48 there corresponds a hydraulic or pneumatic cylinder 60 which is attached to the outside of the container and has a vertically displaceable piston 62 which is connected to a brace 64 upon the end of the supporting arm.

The above-described process vessel and strainer means are known. With the liquid distribution device of the present invention provided within the cellulosic material vessel, a liquid may be introduced within the vessel to wholly or partly displace and substitute the liquid previously contained in the pulp. In other words, there is a liquid exchange within the pulp, i.e., a treating liquid, such as a fiber-liberating or digesting liquid or a bleaching liquid, may be replaced by a second liquid, such as a wash liquid of water or of diluted treating liquid, or, alternatively, a wash liquid may be replaced by a second liquid containing the chemicals required for the next treatment of the pulp, e.g., a new bleaching agent.

As shown in FIGURES 1 and 2, the preferred liquid distribution device of this invention comprises two spray tubes or tubular arms 68, 70, extending substantially vertically from the supporting arms 19 of the scraping device and provided at their lower ends with outlet orifices, such as a row of holes or a single long, narrow slit, and a slit-shaped outlet orifice 72 in the lower portion of the shaft 21. The liquid to be distributed in the process vessel 11 is supplied through a common conduit 74, three stationary conduits 76, 78, 80, each having a control valve 82, 84, 86, respectively, stuffing box 88, and passages in the shaft 21 of the scraping device and the radial supporting arms 19, to outlet orifices upon tubular arms 68, 70 and outlet orifice 72 upon shaft 21. The outlet orifices are located quite far below the scrapers 17, which lead the cellulosic material outwards to pulp outlet 15, thereby determining the highest level of the rising pulp column. The outlet orifices move along concentric cylindrical faces located at a level where the process vessel is maintained filled with cellulosic material. Therefore, the liquid is distributed directly into the cellulosic material at a predetermined distance from the axis of the container, in contrast to known rotary spray tubes of the prior art which move exclusively above the free level of the pulp and spread the liquid where it is free to flow in the radial direction on top of the pulp column before downward penetration into the pulp.

The outlet orifices of the liquid distribution device of this invention are located at approximately the same level as the strainer bodies 29, 31, thereby creating an essentially horizontal and radially directed flow of liquid through the celluolsic material. As shown in FIGURE 2, the tubular arms 68 and 70 have cross-sections which are oblong or streamlined in their direction of motion, whereby the load upon the driving motor 25 is reduced and unnecessary agitation of the pulp is avoided or minimized.

Adjustment of control valves 82, 84, 86 permits ready control of the supply of liquid to the outlet orifices at various radial locations. The control valves 82, 84, 86, which are conveniently located on the outside of the process vessel 11, are mutually independent, so that the quantities of liquid supplied to various radial locations in the container may be adjusted to produce essentially the same degree of displacement or washing over the entire cross-section of the process vessel. It can be appreciated that the outlet orifices situated at a greater radial distance from the axis of the vessel should be supplied a comparatively greater quantity of liquid. In addition, more liquid should be supplied to a tubular arm, such as tubular arm 68, which has to distribute liquid for both radially outward and radially inward flow than to a tubular arm or outlet orifice that distributes liquid merely for flow in one radial direction. Flow meters may be inserted, if desired, into the conduits 76, 78, 80 in order to facilitate the proper adjustment of the respective valves and to provide an indication of possible changes of flow rate, such as a change caused by the partial clogging of outlet orifices, so that compensation may be made by opening the respective control valve somewhat more, thereby increasing the liquid pressure and flow.

In FIGURES 3 to 5, the process vessel 11 corresponds quite closely to that shown in FIGURES 1 and 2, and the same reference numerals have been applied to corresponding parts. However, the strainer bodies 29, 31, have been modified by an interior horizontal partition 51. The cavities on opposite sides of partition 51 communicate with separate passages 53, 55 in support arms 44, 46, 48. The passages 53, 55 are connected to two separate discharge conduits. It is therefore possible with the modified strainer bodies 29, 31 to strain off two different fractions of liquid from the pulp. The fraction from the lower cavity generally has a greater content of treating chemicals, when a treating liquid is being replaced by a wash liquid, than the fraction from the upper cavity. This fraction from the lower cavity may be discharged whereas the fraction from the upper cavity may be recycled if desired, i.e., it may be used as, or mixed into, the wash liquid supplied to at least some of the outlet orifices of the liquid distribution device.

In conformity with the axial division of the strainer bodies 29, 31, the liquid distribution device is arranged to supply liquid at two different levels. A first series of outlet orifices 72, 73, 75 is situated at the level of the upper cavity of the strainer bodies 29, 31. These outlet orifices 72, 73, 75 are respectively located on the shaft 21 and tubular arms 68, 70. A second series of outlet orifices 77, 79, 81 is situated at a lower level, preferably a level corresponding to a level of the partitions 51 or of the level of the lower cavity of the strainer bodies 29, 31. These outlet orifices 77, 79, 81 are respectively placed upon a lower portion on the shaft 21 and upon an additional set of essentially vertically extending tubular arms 83, 85, which arms are somewhat longer than the tubular arms 68, 70. The two series of outlet orifices form part of two separate liquid supply systems which are similar and independent of each other so that they can serve to supply mutually different liquids, one liquid being supplied through a conduit 74 and a control valve 87 and the other liquid being supplied through a conduit 89 and a control valve 91. By means of the stationary valves 87, 91, it is possible to set the total quantity of liquid supplied to each liquid supply system and also to set the ratio of the different liquids. The distribution of the liquid in each distribution system to the respective outlet orifices is accomplished by flow distributing means arranged to rotate with the liquid distributing device. The flow distributing means are formed by a number of overflow weirs, which are described below.

Above the level of arms 19, the shaft 21 supports 3 concentric cylindrical walls 93, 95, 97, of different diameter, each cylindrical wall 93, 95, 97 having bottoms, thereby forming three concentric open tanks. The conduit 74 discharges into the outermost tank 99 and conduit 89 into the innermost tank 101. By means of radial partitions 103 the space between the walls 95 and 97 is divided up into six sector-shaped compartments 105. The bottom of each compartment 105 is in communication through passages in arms 19 and in shaft 21 with a separate outlet orifice or set of outlet orifices. For example, in FIGURE 4 the six compartments 105 are in communication respectively, as counted in the clockwise direction, with orifices 75, 77, 73, 79, 72, 81. At three points of its upper edge the wall 95 is formed with a square recess 107 constituting an overflow edge or sill, over which water from the outer tank 99 can flow into the adjacent compartment 105. The overflow edges of the three recesses are all situated at the same level. Attached to one vertical edge of each recess 107 is a gate 109 which is adjustable in the horizontal direction so that the peripheral extension of the recess, or overflow edge length, can be varied. By adjustment of the gates 109 it is possible to adjust the overflow system so that the water supplied to the outermost tank 99 is distributed in the desired proportions to three of the compartments 105, which are filled by water flowing over the three overflow edges of recesses 107, so that the water ejected into the pulp through the connected outlet orifices 75, 73, 72 is distributed approximately in proportion to the quantities of pulp present between each orifice and the adjacent strainer face or faces. If, for instance, the total quantity of water supplied to tank 99 is increased by adjustment of the valve 87, then the level in tank 99 rises and the amount of water flowing over the overflow edges increases, but the proportions of water flowing to each compartment 105 is constant. The water in the various compartments will rise to different levels, depending upon the flow resistance in the connecting passages and outlet orifices. Should any of the orifices be clogged, then the level in the corresponding compartment rises and may finally reach and begin to flow over the upper edge of the partition 103. This is easily noticed and constitutes a warning signal to take measures for cleaning the orifices. The cleaning may be effected by introducing cleaning wires or flushing hoses into the ends 111 of the conduits connected to bottom parts of the compartments, the ends 111 being easily accessible from above and preferably funnel-shaped.

Innermost wall 97 is likewise provided with three recesses which may be partly closed by adjustable gates and which form overflow edges over which water from the inner tank 101 flows into and is distributed in the desired proportion to the three compartments 105 which are connected to the lower outlet orifices 77, 79, 81. In this independent liquid supply system, which may distribute wash liquid, for example, such as the diluted treatment liquid collected in the upper cavities of the strainer bodies 29, 31, the total flow can be controlled, while the process vessel is in operation, by means of valve 91 without influencing the proportion of the liquid distributed to each of the various outlet orifices, as predetermined by the gate settings.

The liquid distributing device of this invention may also be used with strainer bodies which are constructed differently than those described above, for example, with either rotary or stationary bodies. As the number of concentric bodies is increased, the number of vertical arms 68, 70, 81, 83 having liquid outlet orifices thereon should be correspondingly increased, thus insuring that liquid is supplied at a suitable and approximately uniform distance from each strainer body face. The process vessel shown in FIGURE 6 and 7 is adapted for washing cellulosic pulp continuously supplied to the lower end of the vessel 11, by means of wash liquid supplied by a liquid distributing device located near the top of the container. The wash liquid flows downwardly in counter-current flow to the raising pulp column and the liquid displaced by the wash liquid is removed through strainer girdle 51, which may be inserted in the shell of the lower part of the container. In FIGURE 6, parts designated by numerals lower than number 30 are of similar construction and perform similar functions as the correspondingly numbered parts of FIGURES 1–5.

Vertical arms 53, 55, 57 are attached to the arms 19 of the rotary scraping device. These vertical hollow arms 53, 55, 57 are of a cross-section which is oblong in the direction of motion and curved in conformity with the cylindrical face along which each respective arm moves, in order to set up a resistance as small as possible to the movement of the arms in the pulp. At the lower end of each arm is located an outlet nozzle 59, which is approximately in the shape of triangular horizontal plate having its point directed forward in the direction of motion. Along the entire length of the straight, radially directed, aft edge of each nozzle 59 is a narrow slit 61 through which wash liquid is ejected in a form of a thin film. Wash liquid is supplied to the liquid distributing device through conduit 63, stuffing box 65 and shaft 21, from which the liquid flow is diverted into three separate supply conduits, each leading to a separate outlet nozzle 59. Control valves 67, 69 are inserted into at least two of the separate supply conduits. These supply conduits may be located partly within the arms 19 of the scraping device. By adjusting valves 67, 69 it is possible to vary the proportions of the amount of liquid supplied to each of the three outlet nozzles 59. The outlet nozzles 59 are located at radially different distances from the axis of the process vessel 11, and are at approximately the same level. When the scraping device rotates, the wash liquid will be distributed into the pulp over three flat concentric annular areas situated at approximately the same level and close to each other. With proper adjustment of valves 67, 69, the wash liquid will be distributed quite evenly over the entire cross-section of the vessel 11.

It will be understood the practice of this invention is not confined to the specific embodiments set forth above, but is only limited by the spirit and scope of the following claims.

I claim:

1. In a process vessel for the treatment of cellulosic material comprising an upright cylindrical container adapted for axial flow of cellulosic material, feed means at one end of the container, discharge means at the other end of the container, a liquid distribution device for distributing liquid over the cross-section of the container consisting of at least one tubular arm rotating about the axis of the container and provided with at least two outlet orifices, at least two liquid supply conduits connected to the outlet orifices, and strainer means for straining liquid from the cellulosic material, the improvement comprising liquid distribution means comprising at least two liquid outlet orifices mounted on at least one rotating tubular arm to move at mutually different radial distances from the axis of the container and connected to separate liquid supply conduits, and at least part of the liquid supply conduits are provided with independently adjustable flow control means, whereby the supplied liquid can be controlled as to its distribution in the container between areas located at different radial distances from the container axis.

2. The device of claim 1 wherein the liquid outlet orifices are located at the vertical level in the container where the container is usually filled with cellulosic material, whereby the supplied liquid is spread directly in the cellulosic material at a predetermined distance from the axis of the container.

3. The device of claim 2 wherein the discharge means is a scraping device comprising rotating radial supporting arms located above the cellulosic material, and scraper blades attached to the supporting arms and wherein at least two tubular arms having liquid outlet orifices are attached to and suspended substantially vertically from the supporting arms.

4. The device of claim 2 wherein the strainer means are at least two concentric annular strainer bodies and the liquid outlet orifices are distributed along cylindrical faces and are at about the same level as the strainer bodies, whereby a mainly horizontal and radial flow of liquid through the cellulosic material occurs.

5. The device of claim 2 wherein the strainer means are located at such a vertical level relative to the liquid outlet orifices that a substantially axial flow of liquid through cellulosic material is obtained and the liquid outlet orifices are located at about the same level and are mutually offset whereby they distribute the liquid over substantially the whole cross-secion of the container.

6. The device of claim 1 wherein the flow control means are control valves in the stationary parts of the liquid supply conduits and part of the liquid supply conduits rotate with the liquid outlet orifices.

7. The device of claim 1 wherein the flow control means rotate with the liquid outlet orifices.

8. The device of claim 7 wherein the flow control means comprise two or more horizontal overflow edges situated at the same level and the horizontal lengths of which are adjustable, and a common tank discharging over the overflow edges to each liquid outlet orifice.

9. The device of claim 8 wherein a control valve controls the quantity of liquid flowing into the common tank.

10. The device of claim 8 wherein at least two independent liquid supply systems supply the liquid supply conduits and each liquid supply system is provided with a control means for adjustment of the total quantity of liquid supplied through that system and with distribution control means for distributing a predetermined quantity of liquid to the outlet orifices situated at mutually different radial distances from the container axis.

11. The device of claim 10 wherein two concentric tanks rotate with the supporting arms, a plurality of sector-shaped compartments are located between the concentric tanks, each compartment is in communication with a separate liquid outlet orifice and receives liquid from only one of the concentric tanks.

12. The device of claim 11 wherein the liquid outlet orifices receiving liquid from the inner tank are located at a different level in the container than the liquid outlet orifices receiving liquid from the outer tank.

References Cited

UNITED STATES PATENTS

| | | | |
|---|---|---|---|
| 3,078,703 | 2/1963 | Richter et al. | 68—181 |
| 3,268,923 | 8/1966 | Burling | 68—181 X |
| 3,298,209 | 1/1967 | Laakso | 68—181 |

IRVING BUNEVICH, *Primary Examiner.*